(No Model.)
C. E. WILLIS.
ANCHOR.
No. 270,168. Patented Jan. 2, 1883.
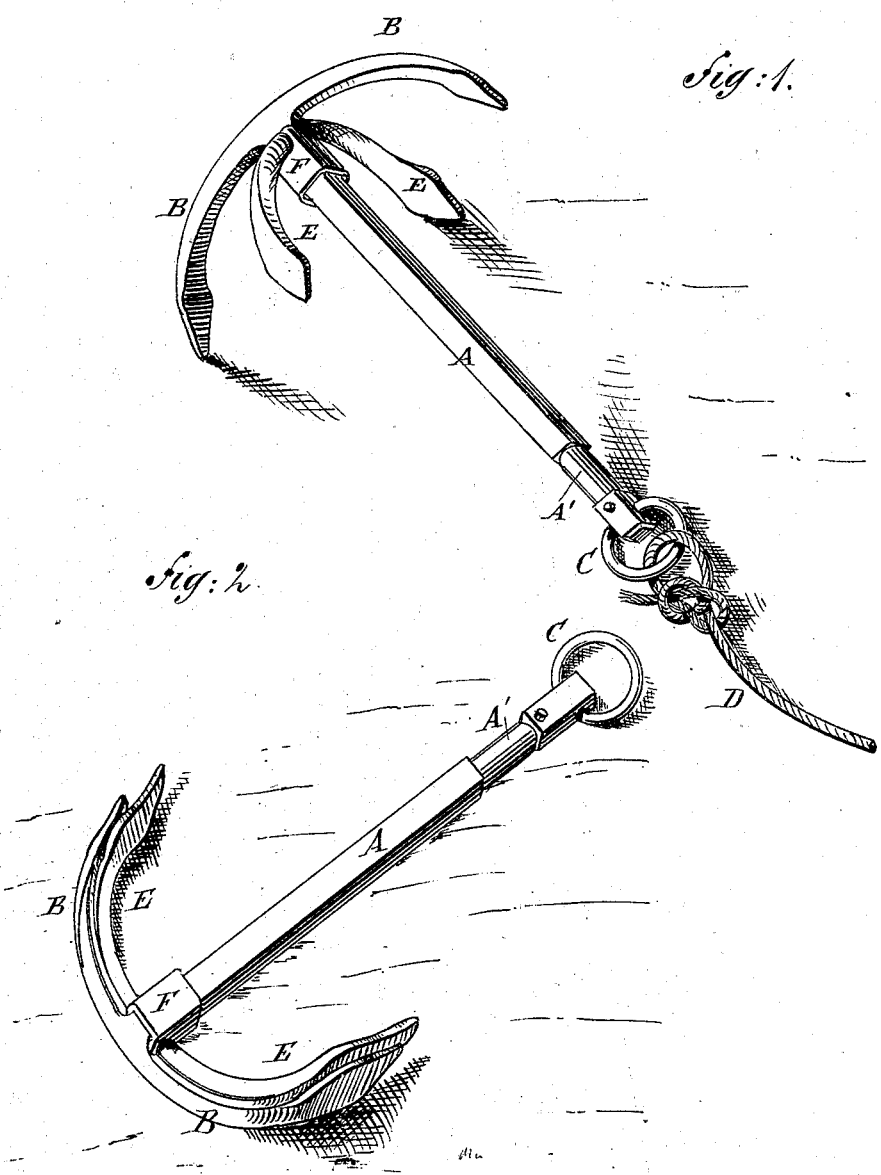
WITNESSES:
INVENTOR:
C. E. Willis
BY
ATTORNEYS.

UNITED STATES PATENT OFFICE.

CHARLES E. WILLIS, OF OYSTER BAY, NEW Y

ANCHOR.

SPECIFICATION forming part of Letters Patent No. 270,168, dated January 2, 1883.

Application filed October 3, 1882. (No model.)

*To all whom it may concern:*

Be it known that I, CHARLES E. WILLIS, of Oyster Bay, in the county of Queens and State of New York, have invented certain new and useful Improvements in Grapnels, of which the following is a full, clear, and exact description.

Reference is to be had to the accompanying drawings, forming a part of this specification, in which similar letters of reference indicate corresponding parts in both the figures.

Figure 1 is a perspective view of my improvements, shown as arranged for use. Fig. 2 is a perspective view of the same, shown as arranged for carriage.

The object of this invention is to promote convenience in carrying grapnels.

The invention consists in a grapnel constructed with a pair of stationary flukes and a pair of adjustable flukes to be arranged parallel with the stationary flukes for convenience in carriage, and at right angles with the said stationary flukes when required for use. The adjustable flukes are formed upon a socket fitted upon the shank to adapt them to be slipped up and down upon it, and the shank is made with a cylindrical part near its upper end to allow the socket of the adjustable flukes to be turned upon the said shank, as will be hereinafter fully described.

A represents the shank of the grapnel, which is made square, and upon its lower end are formed two flukes, B, projecting in opposite directions.

To the upper end of the shank A is attached a ring, C, to receive the rope or cable D.

E are two flukes formed upon the opposite sides of a socket, F, which fits and slides upon the shank A. The shank A has a cylindrical part, A', formed upon it, near its upper end, the part A' being of a length equal to or a little greater than the length of the socket F, and of such a size that the said socket can turn freely upon it. With this construction, when the grapnel is to be carried the flukes E and socket F are slid up the shank A to the cylindrical part A', are turned through one-quarter of a revolution, and are then slipped down upon the said shank A, so as to be parallel with and at the inner side of the stationary flukes B, as shown in Fig. 2, so that the said grapnel can be conveniently stowed for carriage. When the grapnel is to be used the flukes E and socket F are slipped up the shank A to the cylindrical part A', are turned through one-quarter of a revolution, and are slid down the said shank, so that the flukes E will be at right angles with the flukes B, and thus in position for use. The flukes E will be kept in position close to the flukes B by their own weight, or by the resistance of the ground; or they can be fastened in position by a pin or other suitable means.

I am aware that it is not new to combine with a pair of fixed flukes another pair of movable flukes arranged on a sleeve; but

What I claim as new and of my invention is—

A grapnel having the shank of the rigid flukes polygonal at A and rounded at A', in combination with a sliding socket, F, of less length than the round part A' of said shank, whereby the flukes E E may be arranged in the same plane with or at right angles to the rigid flukes, for the purposes specified.

CHARLES E. WILLIS.

Witnesses:
JAMES T. GRAHAM,
C. SEDGWICK.